United States Patent [19]

de Cointet de Fillain et al.

[11] 4,388,430
[45] Jun. 14, 1983

[54] ASSOCIATIONS FOR STABILIZING VINYL RESINS

[75] Inventors: Paul de Cointet de Fillain, Toulouse; Charles Pigerol, Saint-Ouen, both of France

[73] Assignee: Sanofi, Paris, France

[21] Appl. No.: 307,298

[22] Filed: Sep. 30, 1981

[30] Foreign Application Priority Data

Oct. 3, 1980 [FR] France .................................. 80 21243

[51] Int. Cl.³ .......................... C08K 5/17; C08K 5/34; C09K 15/20; C09K 15/30
[52] U.S. Cl. ...................................... 524/99; 252/402; 252/403; 252/405; 524/238; 524/239
[58] Field of Search ................. 252/405, 403; 524/99, 524/238, 239

[56] References Cited

U.S. PATENT DOCUMENTS

| | | | |
|---|---|---|---|
| 3,249,584 | 5/1966 | De Gasparis | 524/238 |
| 3,412,139 | 11/1968 | Eggensperger et al. | 560/38 |
| 3,627,718 | 12/1971 | Seifert et al. | 524/238 |
| 4,209,439 | 6/1980 | Pigerol et al. | 426/106 |
| 4,209,440 | 6/1980 | Pigerol et al. | 252/403 |
| 4,214,088 | 7/1980 | Abeler et al. | 546/321 |
| 4,239,893 | 12/1980 | Pigerol et al. | 546/321 |
| 4,317,768 | 3/1982 | Pigerol et al. | 546/321 |

Primary Examiner—John Kight, III
Assistant Examiner—R. A. White
Attorney, Agent, or Firm—Mason, Kolehmainen, Rathburn & Wyss

[57] ABSTRACT

The invention relates to a combination of derivatives of dihydropyridine and β-aminocrotonic acid derivatives intended for the stabilization of vinyl resins. The combination of a dihydropyridine derivative and a β-aminocrotonic derivative gives rise to synergism of the stabilizing powers of each of those products.

11 Claims, No Drawings

ASSOCIATIONS FOR STABILIZING VINYL RESINS

This invention concerns the stabilization of vinyl resins vis-a-vis agents which induce physical and physicochemical deterioration.

The term "vinyl resin" is understood here to include

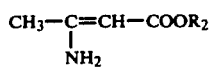

both the homopolymers of vinyl chloride, vinyl acetate, vinylidene chloride type derivatives and the copolymers of these various monomers, in any relative proportions and in any and all applications.

It is known that vinyl resins have a tendency to deteriorate under the influence of heat and that it is essential to add stabilizing agents to these masses of synthetic material with a view to delaying thermic deterioration, and hence coloration.

It is also known that vinyl resins may deteriorate under the influence of sunlight, which may result in an alteration of the original coloration of the resin. This problem is particularly crucial in food packaging, as it is conceivable that it would be impossible to market foodstuffs in packages whose color shifts over time.

Finally, it is likewise known that vinyl resins undergo deterioration under the impact of whatever oxidizing conditions may prevail at their location, notably the presence of oxygen in the atmosphere.

This explains why much time has been spent in the search for agents which can effectively resist these various deteriorations, and preferably are effective against all of them at once.

Among these agents, reference may be made first to the phenols, generally used as anti-oxidants in these resins and including, for example, 2,6-di-t-butyl-4-methylphenol.

More recently, derivatives of dihydropyridines have been proposed for the same use. They may be represented by general formula I below:

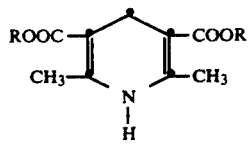

in which R represents a linear alkyl radical containing from 1 to 22 carbon atoms, a linear alkenyl radical containing 3 to 18 carbon atoms, a linear alkynyl radical containing 3 to 11 carbon atoms, or an aralkyl radical, optionally substituted in the ortho or para position by a halogen atom or by a methyl or methoxy radical, or R represents a phenyl radical, optionally substituted in the para position by a methoxy radical or R represents a radical $R_1-O-(CH_2)_n-$ in which n has the value 2, 3 or 4, and $R_1$ represents a linear alkyl radical containing 1 to 4 carbon atoms or a phenyl radical.

Compounds with Formula I have been described in French Pat. Nos. 2,239,496, 2,405,937, 2,405,974, 2,407,236 and 2,439,215, and may be prepared in accordance with the methods described in said patents. They are used as thermostabilizers for vinyl resins in proportions which, according to French Pat. No. 2,239,496, range from 0.2 to 1.5 percent by weight with respect to the resin.

Also known for the same application are the β-aminocrotonates with general formulas II and III.

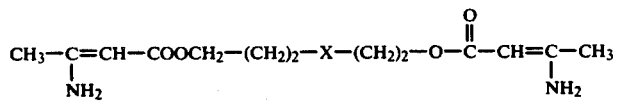

in which:
$R_2$ represents a linear alkyl radical with 1 to 8 carbon atoms or a mixture of linear alkyl radicals containing 16 to 18 carbon atoms, and
X represents a sulfur or oxygen atom or a single bond.
$R_2$ may represent, in particular, a methyl, ethyl or octyl radical.

The β-aminocrotonates II and III are well-known organic thermostabilizers for vinyl resins.

These agents are hence described in the said application in the work by Rene LEFAUX entitled "Les matieres plastiques dans l'industrie alimentaire" (Plastic materials in the food industry, CFE, 1972, pp. 230–232 and 527). They are usually added to masses to be stabilized in a proportion of 0.5 to 1.5 percent by weight.

Among these aminocrotonates, especially used as thermostabilizers are:
β-aminocrotonate of butanediol;
β-aminocrotonate of thiodiglycol;
β-aminocrotonate of a mixture of $C_{16}$–$C_{18}$ alcohols;
methyl β-aminocrotonate.

It is also widely known that these various stabilizing agents, in particular as used in the food industry, have the drawback of giving rise to several disturbing phenomena such as migration toward the food, sublimation, and phosphorescense, which are all the more pronounced as the proportion of the agents is higher. This problem has been referred to in French Pat. No. 2,405,974.

Likewise, in the case of the application of the stabilizers to vinyl copolymers, used for example in the manufacture of phonograph records, reduction of their proportions is desired insofar as that would improve sound quality.

It is evident that reducing the proportion of stabilizer is also sought in all its applications, as it would make it possible to reduce the cost of stabilization.

The invention is based on the discovery that the association or combination of a dihydropyridine of Type I with a β-aminocrotonic derivative of Type II or III has a synergistic effect on the stabilizing powers of each of these products, thereby making it possible to use, while achieving an equivalent stabilizing power, much smaller quantities of the two products, or to obtain a much higher stabilizing power with the customary quantities of these products.

This possibility of using lower proportions of stabilizer is of particular value in the case of resins intended for the manufacture of food packaging. Indeed, it is a desirable objective to reduce the proportions of stabilizers in polyvinyl chloride for food usage in order to reduce migration into the food, and hence the toxicity problem, to the greatest possible extent.

Another advantage stemming from the associations according to the invention is applicable to the stabilization of the vinyl copolymers used in the manufacture of records, the sound reproduction quality of which is improved when small quantities of stabilizers are used, while at the same time the cost of stabilization is reduced.

A further advantage which the associations according to this invention can provide in the formulations for vinyl copolymers is the observation that these associations do not modify the sticking-time when used in such copolymers. This property is important as it makes it possible to use the PVC compound on industrial machines for the extrusion-blowing phase. Moreover, it also sometimes makes it possible to reduce the levels of internal and external lubricants used in the corresponding formulas.

As regards food applications of the stabilized vinyl resin compounds according to this invention, the French patents referred to above indicate that the Formula I compounds have slight acute toxicity, with the $LD_{50}$ exceeding 2 g/kg orally in mice. Likewise, the β-aminocrotonates are compounds which have no toxicity at all; they have the desired characteristics of stabilizers for packaging food and drink. By way of example, $LD_{50}$ in rats for β-aminocrotonate of butanediol is in excess of 4 g/kg, and that of the β-aminocrotonate of thiodiglycol is in excess of 7.24 g/kg.

It hence appears that the associations according to this invention will present no toxicity problem and that their use for food wrapping stabilization may be envisaged, as migration is all the lower when the quantities of stabilizers to be used are lower, one of the major advantages of this invention.

It will be recalled, moreover, that the β-aminocrotonates are insoluble in water and have been approved in France and throughout the E.E.C. for several years as stabilizers for packaging food and drink.

Experimental study of the associations according to the invention has made it possible to show that:

1. the components of these associations are mutually compatible and compatible with vinyl resins (homopolymers and copolymers);

2. The associations thermostabilize polyvinyl chloride and its copolymers, making it possible to reduce the quantity of β-aminocrotonic stabilizer.

It is very advantageous to be able to reduce the quantity of β-aminocrotonic stabilizer in formulas designed for food packaging by using the associations according to this invention, as this type of stabilizer often imparts an ammonia-like taste to the food when it is used in quantities needed for stabilization.

3. The associations photostabilize polyvinyl chloride and its copolymers.

4. When associated, Formula I compounds and β-aminocrotonic compounds demonstrate synergism of their thermostabilizing properties.

The objects of this invention are thus:

First, a new stabilizing association for vinyl resins made up of vinyl polymers or copolymers for purposes of stabilizing them with respect to the destructive effects of heat, light, and chemical oxidizing agents, said association consisting of a Formula I dihydropyridine derivative and a Formula II or III β-aminocrotonate.

Second, a vinyl resin stabilized by the addition to said resin of a Formula I dihydropyridine derivative in the proportion of 0.01 to 0.5, preferably 0.01 to 0.3, part by weight per 100 parts of resin and a Formula II or III β-aminocrotonic derivative in the proportion of 0.1 to 1.0, and preferably 0.1 to 0.5, part by weight per 100 parts of resin.

Third, a procedure for the stabilization of vinyl resins against the deteriorating effects of heat, light and chemical oxidizing agents, said procedure consisting in adding an association such as that described above to said resin.

Four, the application of said stabilized vinyl resins to the manufacture of commercial and industrial articles, especially, but not exclusively, intended for the food industry.

The synergy phenomenon resulting from the use of the stabilizing associations according to the invention may, as indicated above, present several different aspects.

Accordingly, notably in the food industry, it may be advantageous to decrease the proportions of stabilizing agents so as to obtain the necessary and sufficient stabilizing effects which are already known, but to do so without the drawbacks which previously resulted from the higher proportions of said agents.

Likewise, it may be desirable to decrease the proportion of only one of the agents used, taking advantage of the synergy effect resulting from the presence of a small proportion of the other agent.

A different stabilizing effect may also be achieved, for example, one which sets in more rapidly or which is longer lasting and/or one which is more effective against conditions which cause deterioration, as for example, higher temperature or a more corrosive atmosphere.

It is hence possible to modify the application of the invention depending on the objectives sought by varying not only the nature of each of the components of the association, but also its relative proportions, said factors themselves depending also on the nature of the resin mass treated.

The following experimental studies show the broad range of possibilities. It goes without saying that known means are used to add the stabilizing compositions of this invention to the resin mass.

To make it easier to present the results, the compounds making up the associations according to this invention have been designated as follows:

| Formula I compounds | |
|---|---|
| 2,6-Dimethyl-3,5-dicarbooctyloxy-1,4-dihydropyridine | L 28502 |
| 2,6-Dimethyl-3,5-dicarbomethoxy-1,4-dihydropyridine | L 28504 |
| 2,6-Dimethyl-3,5-dicarbododecyloxy-1,4-dihydropyridine | L 28507 |
| 2,6-Dimethyl-3,5-dicarbopropyloxy-1,4-dihydropyridine | L 28509 |
| 2,6-Dimethyl-3,5-dicarboallyloxy-1,4-dihydropyridine | L 28511 |
| 2,6-Dimethyl-3,5-dicarbobenzyloxy-1,4-dihydropyridine | L 28512 |
| 2,6-Dimethyl-3,5-dicarbopropargyloxy-1,4-dihydropyridine | L 28513 |
| 2,6-Dimethyl-3,5-dicarbo(methoxy-4'-phenoxy)-1,4-dihydropyridine | L 28541 |
| 2,6-Dimethyl-3,5-dicarbo(phenoxy-2'-ethoxy)-1,4-dihydropyridine | L 28588 |
| 2,6-Dimethyl-3,5-dicarbotetradecyloxy-1,4-dihydropyridine | L 28590 |
| 2,6-Dimethyl-3,5-dicarbodecyloxy-1,4-dihydropyridine | L 28591 |
| 2,6-Dimethyl-3,5-dicarbotridecyloxy-1,4-dihydropyridine | L 28596 |
| 2,6-Dimethyl-3,5-dicarbooctadecyloxy-1,4-dihydropyridine | L 28599 |

-continued

| Formula I compounds | |
|---|---|
| 2,6-Dimethyl-3,5-dicarbobehenyloxy-1,4-dihydropyridine | L 28601 |
| 2,6-Dimethyl-3,5-dicarbopalmityloxy-1,4-dihydropyridine | L 28603 |

A Formula I compound in which R represents the alkyl radical of DOBANOL 23 (mixture of primary alcohols containing 12 to 15 carbon atoms and marketed by Shell-Chimie) is represented by the code L 28597, while code L 28604 corresponds to a Formula I compound in which R represents the alkyl radical of ALFOL 10–14 (mixture of primary alcohols containing 10 to 14 carbon atoms and marketed by Condea-Chimie).

| Derivatives of β-aminocrotonic acid | |
|---|---|
| β-Aminocrotonate of butanediol | 4 |
| β-Aminocrotonate of thiodiglycol | 5 |
| β-Aminocrotonate of a mixture of alcohols containing 16 to 18 carbon atoms | 6 |
| Methyl β-aminocrotonate | 7 |

A. Study of the compatibility of Formula I Compounds and the β-aminocrotonates

We first verified the perfect compatibility of the Formula I dihydropyridines with the β-aminocrotonates in vinyl resins.

To do this, it was demonstrated that the addition to a vinyl resin of a Formula I stabilizer and of an aminocrotonic stabilizer increased the stability of the said resin.

Study of static thermostability
(a) Stabilization of polyvinyl chloride

The study of the thermostabilization of the resin below was carried out in accordance with the method described in French Pat. No. 2,273,841.

The resin tested underwent calendering in a mixer with heating cylinders raised to a temperature of 160° C.; the rigid sheets obtained were then subjected to periods in a drying oven at 210° C. until carbonization began.

A ventilated and thermostatically controlled oven was used for this treatment.

The coloration of a sheet containing the stabilizer to be tested was then compared to that of a sheet prepared under the same conditions but without the stabilizer, with colorations evaluated in accordance with the Gardner scale.

The following resin was used:

| Ingredients | Parts by weight |
|---|---|
| Polyvinyl chloride (Solvic 258 RD from SOLVAY) | 100 |
| Acrylic resin | 8 |
| Epoxidized soya oil | 4 |
| Calcium stearate | 0.2 |
| Hydrogenated castor oil | 1.2 |
| Glycerol trimontanate | 0.4 |
| Stabilizer(s) | 0.3 |

The stability bands were maintained in the oven for 0, 3, 6, 9, 12, 15, 18 and 21 minutes, and the following results were obtained:

TABLE 1

| STABILIZER | | | | TIME IN MINUTES | | | | | | | |
|---|---|---|---|---|---|---|---|---|---|---|---|
| Code No. | Conc. | N° | Conc. | 0 | 3 | 6 | 9 | 12 | 15 | 18 | 21 |
| — | — | 4 | 0.3 | 1 | 1 | <2 | 8 | 14 | 17 | — | — |
| L 28504 | 0.2 | 4 | 0.1 | 1 | 1 | >2 | 6 | 9 | 13 | — | — |
| L 28507 | 0.2 | 4 | 0.1 | 1 | 1 | <3 | 8.5 | 13 | 16 | — | — |
| L 28511 | 0.2 | 4 | 0.1 | 1 | 1 | >2 | 6 | 8.5 | <11 | — | — |
| L 28512 | 0.2 | 4 | 0.1 | 1 | 1 | >2 | 7 | >8 | >11 | — | — |
| L 28597 | 0.2 | 4 | 0.1 | 1 | 1 | <3 | >7 | <11 | >18 | — | — |
| — | — | 6 | 0.3 | 1 | >1 | 3 | 10.5 | 14 | 17 | — | — |
| L 28504 | 0.2 | 6 | 0.1 | 1 | >1 | 3 | 6 | 9 | 11 | — | — |
| L 28507 | 0.2 | 6 | 0.1 | 1 | >1 | >3 | 10.5 | 11 | 15 | — | — |
| L 28511 | 0.2 | 6 | 0.1 | 1 | >1 | >2 | 6 | 7 | 10.5 | — | — |
| L 28512 | 0.2 | 6 | 0.1 | 1 | >1 | >2 | 7 | 10 | 11 | — | — |
| L 28597 | 0.2 | 6 | 0.1 | 1 | >1 | 3 | 8.5 | 11 | 13 | — | — |
| — | — | 5 | 0.3 | 1 | 1 | >1 | 3 | 5 | <12 | 15 | 18 |
| L 28504 | 0.2 | 5 | 0.1 | 1 | 1 | >1 | 3 | 4 | 6 | 10.5 | 16 |
| L 28507 | 0.2 | 5 | 0.1 | 1 | 1 | >1 | 3 | >4 | 11 | 16 | 18 |
| L 28511 | 0.2 | 5 | 0.1 | 1 | 1 | >1 | >2 | >3 | 6 | 10 | 14 |
| L 28512 | 0.2 | 5 | 0.1 | 1 | 1 | >1 | <3 | 4 | 9.5 | 11 | 14 |
| L 28597 | 0.2 | 5 | 0.1 | 1 | 1 | >1 | 4 | 7 | 11 | 14 | 17 |
| — | — | 7 | 0.3 | 1 | 1 | 4 | >11 | 15 | >18 | — | — |
| L 28504 | 0.2 | 7 | 0.1 | 1 | 1 | 3 | 8 | 10.5 | 16 | — | — |
| L 28507 | 0.2 | 7 | 0.1 | 1 | 1 | 4 | 9 | 11 | burned | — | — |
| L 28511 | 0.2 | 7 | 0.1 | 1 | 1 | >2 | 7.5 | 10 | 16 | — | — |
| L 28512 | 0.2 | 7 | 0.1 | 1 | 1 | 4 | 8 | 11 | 17 | — | — |
| L 28597 | 0.2 | 7 | 0.1 | 1 | 1 | >4 | 10.5 | 14 | >18 | — | — |
| — | — | 4 | 0.3 | 1 | 1 | 4 | 11 | <13 | 17 | — | — |
| L 28509 | 0.2 | 4 | 0.1 | 1 | <2 | <2 | <8 | 9 | <11 | 17 | — |
| L 28513 | 0.2 | 4 | 0.1 | 1 | <2 | 4 | 8 | 9.5 | 14 | 16 | — |
| L 28588 | 0.2 | 4 | 0.1 | 1 | <2 | >3 | 9.5 | 10.5 | 15 | burned | — |
| L 28604 | 0.2 | 4 | 0.1 | 1 | 1 | <3 | 6 | 8.5 | 11 | 14 | — |
| — | — | 6 | 0.3 | 1 | <2 | 10 | 14 | 16 | — | — | — |
| L 28588 | 0.2 | 6 | 0.1 | 1 | <2 | 4 | 9 | >11 | — | — | — |
| L 28599 | 0.2 | 6 | 0.1 | 1 | 2 | 8.5 | 11 | 14 | — | — | — |
| — | — | 5 | 0.3 | 1 | 1 | 1 | 1 | 5 | 11 | — | — |
| L 28588 | 0.2 | 5 | 0.1 | 1 | 1 | 1 | 2 | 5 | 10.5 | — | — |
| L 28599 | 0.2 | 5 | 0.1 | 1 | 1 | 1 | 2 | 5 | <11 | — | — |
| — | — | 4 | 0.3 | 1 | 1 | >1 | <2 | >4 | 14 | — | — |
| L 28590 | 0.2 | 4 | 0.1 | 1 | 1 | >1 | <2 | 4 | 11 | — | — |
| L 28601 | 0.2 | 4 | 0.1 | 1 | 1 | <2 | >2 | 4 | <12 | — | — |

TABLE 1-continued

| STABILIZER | | | | TIME IN MINUTES | | | | | | | |
|---|---|---|---|---|---|---|---|---|---|---|---|
| Code No. | Conc. | N° | Conc. | 0 | 3 | 6 | 9 | 12 | 15 | 18 | 21 |
| L 28603 | 0.2 | 4 | 0.1 | 1 | 1 | <2 | 3 | 4 | >11 | — | — |

All the results show the superiority of the associations according to this invention over the β-aminocrotonates used alone, and hence show the perfect compatibility of the Formula I dihydropyridines and the β-aminocrotonates in vinyl resins.

(b) Stabilization of vinyl chloride-vinyl acetate copolymers

| Ingredients | Parts by weight |
|---|---|
| Vinyl chloride-vinyl acetate (LUCOVYL MA 6035 from RHONE-POULENC) | 65 |
| Vinyl chloride-vinyl acetate (LUCOVYL GA 8502 from RHONE-POULENC) | 25 |
| Poly inyl chloride (LUCOVYL MB 1000 from RHONE-POULENC) | 10 |
| Calcium stearate | 0.3 |
| Stabilizer(s) | 0.5 |

The stability bands are kept in a ventilated oven at 185° C. for 0, 2, 4, 6, 8, 10, 12, 14 and 16 minutes and their coloration quantified in accordance with the Gardner scale.

The following results were obtained:

TABLE 2

| Stabilizer | | | | Time in minutes | | | | | | | | |
|---|---|---|---|---|---|---|---|---|---|---|---|---|
| Code No. | Conc. | N° | Conc. | 0 | 2 | 4 | 6 | 8 | 10 | 12 | 14 | 16 |
| — | — | 4 | 0.5 | 1 | 1 | >2 | 8 | 10 | 17 | 17 | burned | — |
| L 28504 | 0.5 | — | — | >2 | >2 | 3 | 7 | >11 | <13 | >18 | burned | — |
| L 28504 | 0.2 | 4 | 0.3 | 2 | 2 | >2 | >4 | <7 | <11 | >11 | >18 | — |
| L 28507 | 0.5 | — | — | 2 | 2 | >2 | 5 | 12 | >18 | >18 | burned | — |
| L 28507 | 0.2 | 4 | 0.3 | 2 | 2 | 2 | >3 | <7 | <11 | 13 | >18 | — |
| — | — | 4 | 0.5 | 1 | 1 | >2 | 3 | 8 | >18 | >18 | — | — |
| L 28512 | 0.5 | — | — | 2 | 2 | 3 | 5 | >10 | burned | — | — | — |
| L 28512 | 0.3 | 4 | 0.2 | 2 | 2 | 2 | <4 | 7 | >11 | 17 | burned | — |
| L 28513 | 0.5 | — | — | 2 | 2 | <3 | 4 | <7 | <18 | >18 | burned | — |
| L 28513 | 0.2 | 4 | 0.3 | 2 | 2 | 2 | <4 | 7 | >11 | 17 | burned | — |
| — | — | 4 | 0.5 | 1 | 1 | >2 | 4 | 6 | 17 | 18 | burned | — |
| L 28590 | 0.5 | — | — | >2 | >2 | <3 | >4 | 8 | 18 | >18 | burned | — |
| L 28590 | 0.3 | 4 | 0.2 | 1 | 1 | <2 | 3 | 5 | <13 | 18 | burned | — |
| L 28591 | 0.5 | — | — | <3 | <3 | 3 | 5 | 8 | 18 | >18 | burned | — |
| L 28591 | 0.2 | 4 | 0.3 | 1 | 1 | 2 | 3 | 5 | 13 | 18 | burned | — |
| — | — | 4 | 0.5 | >1 | >1 | >2 | 3 | 10 | 17 | >18 | burned | — |
| L 28596 | 0.5 | — | — | >1 | >1 | 3 | 4 | <11 | burned | — | — | — |
| L 28596 | 0.2 | 4 | 0.3 | >1 | >1 | 2 | 3 | 10 | 13 | >18 | burned | — |
| — | — | 6 | 0.5 | 1 | 1 | >1 | 3 | 10 | 17 | >18 | burned | — |
| L 28504 | 0.5 | — | — | 2 | 2 | >2 | 3 | 10 | 14 | >18 | burned | — |
| L 28504 | 0.3 | 6 | 0.2 | 2 | 2 | >2 | <3 | 5 | >11 | <14 | burned | — |
| — | — | 6 | 0.5 | 1 | 1 | >1 | 3 | 10 | 17 | >18 | burned | — |
| L 28511 | 0.5 | — | — | 2 | 2 | >2 | 3 | 10 | 14 | >18 | burned | — |
| L 28511 | 0.2 | 6 | 0.3 | 2 | 2 | >2 | <3 | 5 | >11 | <14 | burned | — |
| — | — | 5 | 0.5 | 1 | 1 | >2 | 5 | 7 | 11 | 14 | 18 | — |
| L 28504 | 0.5 | — | — | 1 | 2 | 3 | 7 | 14 | 18 | 18 | burned | — |
| L 28504 | 0.2 | 5 | 0.3 | 1 | 2 | <3 | 4 | >7 | <11 | <11 | 18 | burned |
| — | — | 5 | 0.5 | 1 | 1 | 2 | 5 | 11 | 16 | 18 | burned | — |
| L 28511 | 0.5 | — | — | >2 | >2 | >2 | 4 | 10 | 13 | burned | — | — |
| L 28511 | 0.2 | 5 | 0.3 | >2 | >2 | >2 | 4 | 8 | >10 | 16 | burned | — |
| L 28512 | 0.5 | — | — | >2 | >2 | 3 | 7 | 12 | 18 | burned | — | — |
| L 28512 | 0.2 | 5 | 0.3 | >2 | >2 | >2 | <4 | 8 | 11 | 18 | burned | — |

The above table clearly shows the superiority of the associations according to the invention over the Formula I compounds and the β-aminocrotonates used alone.

The same tests were carried out using the following resin:

| Ingredients | Parts by weight |
|---|---|
| Vinyl chloride-vinyl acetate (LUCOVYL MA 6035) | 80 |
| Polyvinyl chloride (LUCOVYL MB 1000) | 20 |
| Calcium stearate | 0.5 |
| Stabilizer(s) | 0.2 to 0.5 |

The following results were obtained:

TABLE 3

| Stabilizer | | | | Time in minutes | | | | | | |
|---|---|---|---|---|---|---|---|---|---|---|
| Code No | Conc. | N° | Conc. | 0 | 2 | 4 | 6 | 8 | 10 | 12 |
| — | — | 4 | 0.5 | 1 | 1 | >2 | >4 | >11 | 12 | 15 |
| L 28504 | 0.15 | 4 | 0.15 | 1 | 1 | 2 | >3 | 4 | >10 | <12 |
| L 28504 | 0.10 | 4 | 0.10 | 1 | 1 | >2 | 4 | 10 | 11 | >13 |
| — | — | 4 | 0.5 | 1 | 2 | 3 | 8.5 | 12 | 15 | 18 |
| L 28511 | 0.15 | 4 | 0.15 | 1 | 2 | <3 | >5 | 9 | <13 | >16 |
| L 28512 | 0.15 | 4 | 0.15 | 1 | 2 | <3 | >5 | 10 | 13 | 17 |
| L 28588 | 0.15 | 4 | 0.15 | 1 | 2 | <3 | 5 | 10 | >13 | >17 |
| — | — | 5 | 0.5 | 1 | >1 | 3 | 4 | 10.5 | 12 | 17 |

TABLE 3-continued

| Stabilizer | | | | Time in minutes | | | | | | |
|---|---|---|---|---|---|---|---|---|---|---|
| Code No | Conc. | N* | Conc. | 0 | 2 | 4 | 6 | 8 | 10 | 12 |
| L 28504 | 0.15 | 5 | 0.15 | 1 | >1 | <3 | <4 | 5 | 10 | 13 |
| L 28511 | 0.15 | 5 | 0.15 | 1 | >1 | 3 | 8 | <10 | >10 | >11 |
| L 28512 | 0.15 | 5 | 0.15 | 1 | >1 | 3 | 8 | <11 | >11 | >12 |
| L 28588 | 0.15 | 5 | 0.15 | 1 | >1 | 3 | 8 | <11 | >11 | >12 |
| — | — | 7 | 0.15 | 1 | 1 | 4 | 11 | 13 | 16 | 18 |
| L 28504 | 0.15 | 7 | 0.15 | 1 | 1 | <3 | <4 | 8 | <11 | 14 |
| L 28511 | 0.15 | 7 | 0.15 | 1 | 1 | 4 | 6 | >7 | 12 | 14 |
| L 28512 | 0.15 | 7 | 0.15 | 1 | 1 | <4 | 5 | 7 | 12 | 17 |
| L 28588 | 0.15 | 7 | 0.15 | 1 | 1 | 4 | <6 | 9 | 12 | 17 |

It is apparent from the above results that 0.3 part of a mixture of a compound of formula I (0.15 part) and an aminocrotonic compound (0.15 part) has a stabilizing power which is greater than or equal to that obtained with 0.5 part of the same β-aminocrotonate. This makes it possible to decrease the quantity of stabilizer in the resin; as noted above, such a reduction makes it possible to improve the sound reproduction quality of records manufactured with vinyl copolymers such as the above, as well as to reduce the cost of production.

Comparable results were also obtained with the following resin:

| Ingredients | Parts by weight |
|---|---|
| Vinyl chloride-vinyl acetate (LUCOVYL MA 6035) | 80 |
| Polyvinyl chloride (RB 8010) | 20 |
| Calcium stearate | 0.5 |
| Stabilizer(s) | 0.3 or 0.5 |

The results obtained are summarized in the following table:

TABLE 4

| Stabilizer | | | | Time in minutes | | | | | | | |
|---|---|---|---|---|---|---|---|---|---|---|---|
| Code No. | Conc. | N* | Conc. | 0 | 2 | 4 | 6 | 8 | 10 | 12 | 14 |
| — | — | 4 | 0.5 | 1 | >1 | >2 | 4 | >5 | 10 | 17 | burned |
| L 28504 | 0.15 | 4 | 0.15 | 1 | >1 | <2 | 3 | <5 | <9 | 16 | burned |
| L 28511 | 0.15 | 4 | 0.15 | 1 | 1 | >2 | >3 | 4 | <9 | 16 | burned |
| — | — | 5 | 0.5 | >1 | >1 | 2 | <3 | 8 | 12 | 14 | 17 |
| L 28504 | 0.15 | 5 | 0.15 | >1 | >1 | <2 | 3 | >4 | 8.5 | 11 | 13 |
| L 28511 | 0.15 | 5 | 0.15 | 1 | 1 | 2 | 4 | <7 | 8.5 | >12 | >15 |
| L 28512 | 0.15 | 5 | 0.15 | 1 | 1 | 2 | 3 | <7 | 10 | >12 | 13 |
| L 28588 | 0.15 | 5 | 0.15 | 1 | 1 | <2 | 3 | 8 | 10.5 | >12 | 15 |
| — | — | 5 | 0.5 | >1 | >1 | 2 | <3 | 8 | 12 | 14 | 17 |
| L 28504 | 0.15 | 5 | 0.15 | >1 | >1 | <2 | 3 | >4 | 8.5 | 11 | 13 |
| L 28503 | 0.15 | 5 | 0.15 | 1 | 1 | >2 | 4 | 8 | 11 | <13 | 17 |
| L 28511 | 0.15 | 5 | 0.15 | 1 | 1 | 2 | 4 | <7 | 8.5 | >12 | >15 |
| L 28512 | 0.15 | 5 | 0.15 | 1 | 1 | 2 | 3 | <7 | 10 | >12 | 13 |
| L 28588 | 0.15 | 5 | 0.15 | 1 | 1 | <2 | 3 | 8 | 10.5 | >12 | 15 |

The above table shows that it suffices to use a mixture according to the invention made up of 0.15 part of each of the components to obtain stabilization equivalent to that produced by 0.5 part of β-aminocrotonate used by itself.

Finally, tests were carried out with the following resin:

| Ingredients | Parts by weight |
|---|---|
| Vinyl chloride-vinyl acetate (SOLVIC 547 SA from SOLVAY) | 80 |
| Polyvinyl chloride (LACQVIL SO71 from ATO-CHIMIE) | 20 |
| Calcium stearate | 0.5 |
| Stabilizer(s) | 0.3 or 0.5 |

The following results were obtained

TABLE 5

| Stabilizer | | | | Time in minutes | | | | | | | |
|---|---|---|---|---|---|---|---|---|---|---|---|
| Code No. | Conc. | N* | Conc. | 0 | 2 | 4 | 6 | 8 | 10 | 12 | 14 |
| — | — | 4 | 0.5 | 1 | >1 | >2 | 4 | >5 | 10 | 17 | — |
| L 28504 | 0.15 | 4 | 0.15 | 1 | >1 | <2 | 3 | <5 | <9 | 16 | — |
| L 28511 | 0.15 | 4 | 0.15 | 1 | 1 | >2 | >3 | 4 | <9 | 16 | — |
| — | — | 5 | 0.5 | >1 | >1 | 2 | <3 | 8 | 12 | 14 | 17 |
| L 28504 | 0.15 | 5 | 0.15 | >1 | >1 | <2 | 3 | >4 | 8.5 | 11 | 13 |
| L 28511 | 0.15 | 5 | 0.15 | 1 | 1 | 2 | 4 | <7 | 8.5 | >12 | >15 |
| L 28512 | 0.15 | 5 | 0.15 | 1 | 1 | 2 | 3 | <7 | 10 | >12 | 13 |
| L 28588 | 0.15 | 5 | 0.15 | 1 | 1 | <2 | 3 | 8 | 10.5 | >12 | 15 |
| — | — | 7 | 0.5 | >1 | <2 | 4 | 10 | 12 | 16 | 18 | — |
| L 28504 | 0.15 | 7 | 0.15 | 1 | 1 | 1 | >3 | 7.5 | 11 | 15 | — |
| L 28507 | 0.15 | 7 | 0.15 | 1 | 1 | <2 | 7 | 8.5 | 10 | 16 | — |
| L 28511 | 0.15 | 7 | 0.15 | 1 | 1 | >2 | <7 | 8.5 | >11 | >15 | — |
| L 28512 | 0.15 | 7 | 0.15 | 1 | 1 | 2 | 7 | 8.5 | 11 | 15 | — |
| L 28588 | 0.15 | 7 | 0.15 | 1 | 1 | 2 | 7 | 8.5 | 11 | 15 | — |

These results confirm the conclusions drawn from the previous tests.

(c) Stabilization of vinyl chloride-vinylidene chloride copolymers

Tests were conducted in a ventilated oven at 210° C. with the following resin:

| Ingredients | Parts by weight |
|---|---|
| Polyvinyl chloride (SOLVIC 258 RD) | 90 |
| Vinyl chloride-vinylidene chloride (GEON 222) | 10 |
| Acrylic resin | 8 |
| Epoxidized soya oil | 4 |
| Calcium stearate | 0.2 |
| Hydrogenated castor oil | 1.2 |
| Glycerol trimontanate | 0.4 |
| Stabilizer(s) | 0.3 |

The following results were obtained:

TABLE 6

| Stabilizer | | | | Time in minutes | | | | | | | |
|---|---|---|---|---|---|---|---|---|---|---|---|
| Code No. | Conc. | N° | Conc. | 0 | 3 | 6 | 9 | 12 | 15 | 18 | 21 |
| — | — | 4 | 0.3 | 1 | >1 | 2 | 9 | 15 | 17 | — | — |
| L 28504 | 0.2 | 4 | 0.1 | 1 | >1 | <3 | >7 | <11 | 15 | — | — |
| L 28507 | 0.2 | 4 | 0.1 | 1 | >1 | 4 | 9 | >14 | 17 | — | — |
| L 28511 | 0.2 | 4 | 0.1 | 1 | >1 | 2 | 6 | 7 | 8.5 | — | — |
| L 28512 | 0,2 | 4 | 0,1 | 1 | >1 | 3 | 6 | 8 | 10,5 | — | — |
| — | — | 4 | 0,3 | 1 | 1 | >1 | >3 | 10 | <12 | 17 | — |
| L 28513 | 0,2 | 4 | 0,1 | 1 | 1 | >2 | >3 | >7 | 10,5 | 14 | — |
| L 28597 | 0,2 | 4 | 0,1 | 1 | 1 | >2 | >3 | 7 | 9 | 14 | — |
| — | — | 5 | 0,3 | 1 | 1 | 1 | <3 | 10 | <12 | 15 | 17 |
| L 28504 | 0,2 | 5 | 0,1 | 1 | 1 | 1 | <3 | 6 | 7,5 | 10,5 | <14 |
| L 28507 | 0,2 | 5 | 0,1 | 1 | 1 | 1 | <3 | 6 | 8 | 11 | 15 |
| L 28511 | 0,2 | 5 | 0,1 | 1 | 1 | 1 | <3 | 6 | 7 | 11 | 14 |
| L 28512 | 0,2 | 5 | 0,1 | 1 | 1 | 1 | <3 | 6 | 8 | <11 | 14 |
| L 28588 | 0,2 | 5 | 0,1 | 1 | 1 | 1 | 3 | 6 | 8,5 | 11 | 14 |
| — | — | 5 | 0,3 | 1 | 1 | >1 | >2 | 10,5 | 14 | 17 | — |
| L 28513 | 0,2 | 5 | 0,1 | 1 | 1 | >1 | >2 | 6 | 11 | 14 | — |
| L 28590 | 0,2 | 5 | 0,1 | 1 | 1 | >1 | <3 | 10,5 | <13 | 16 | — |
| L 28597 | 0,2 | 5 | 0,1 | 1 | 1 | >1 | >2 | >6 | 10,5 | <14 | — |
| L 28601 | 0,2 | 5 | 0,1 | 1 | 1 | >1 | 4 | 10 | 14 | 16 | — |
| — | — | 7 | 0,3 | 1 | >1 | 5 | >11 | 16 | 18 | burned | — |
| L 28504 | 0,2 | 7 | 0,1 | 1 | >1 | >3 | 7 | 9 | 14 | burned | — |
| L 28507 | 0,2 | 7 | 0,1 | 1 | 1 | 3 | 7 | <11 | 14 | burned | — |
| L 28511 | 0,2 | 7 | 0,1 | 1 | 1 | >2 | 8 | <10 | 14 | burned | — |
| L 28512 | 0,2 | 7 | 0,1 | 1 | 1 | >2 | 6 | 10 | 11 | 17 | — |
| L 28588 | 0,2 | 7 | 0,1 | 1 | 1 | 3 | 7 | <11 | 14 | 18 | — |
| — | — | 7 | 0,3 | 1 | >1 | 4 | 11 | 17 | 18 | — | — |
| L 28513 | 0,2 | 7 | 0,1 | 1 | >1 | 3 | 7 | 10,5 | 13 | — | — |
| L 28590 | 0,2 | 7 | 0,1 | 1 | >1 | 4 | 8 | 13 | 16 | — | — |
| L 28597 | 0,2 | 7 | 0,1 | 1 | >1 | 3 | >7 | 10,5 | <13 | — | — |
| L 28601 | 0,2 | 7 | 0,1 | 1 | >1 | <4 | 10 | 13 | 16 | — | — |
| — | — | 6 | 0,3 | 1 | >1 | 4 | <12 | 17 | burned | — | — |
| L 28504 | 0,2 | 6 | 0,1 | 1 | >1 | 3 | 7 | 10 | burned | — | — |
| L 28507 | 0,2 | 6 | 0,1 | 1 | 1 | >2 | 7 | 10,5 | burned | — | — |
| L 28511 | 0.2 | 6 | 0.1 | 1 | >1 | 3 | 7.5 | 10 | burned | — | — |
| L 28512 | 0.2 | 6 | 0.1 | 1 | 1 | 3 | 7.5 | >10 | 17 | — | — |

These results clearly show the superiority of the associations according to the invention over β-aminocrotonate used alone.

Conclusions:

All the above results taken together prove clearly the perfect compatibility of Formula I compounds and β-aminocrotonates in vinyl resins.

In addition, we now know that using the associations according to this invention makes it possible to retain an equivalent stabilization while decreasing the overall quantity of stabilizers in the resin, which is of interest because:

it reduces the production cost of stabilization; it improves the quality of the resulting finished products (by reducing the pollution of the contents of food packaging, for example).

Finally, Table 2 shows that there is synergism of the stabilizing powers of the different components of the associations according to the invention for vinyl chloridevinyl acetate copolymers.

B. Study of the synergism of the stabilizing power of the Formula I compounds and the β-aminocrotonates In Chapter A, it was shown that the associations according to the invention are superior to the β-aminocrotonates used alone for all the resins and to the Formula I compounds used alone (for vinyl chloride-vinyl acetate copolymers).

It was also noted that the associations according to the invention were superior to both the aminocrotonates and the Formula I compounds used along for polyvinyl chloride, and that there was synergism of the stabilizing power of each of the components of the combination according to this invention for these resins as well.

This synergism has been shown by studying the dynamic thermostability of polyvinyl chloride resins containing, as stabilizer, a Formula I compound alone, a β-aminocrotonate alone, or an association of the two.

To do so, the following test was carried out:

The resin was poured over cylinders whose temperature was set at 210° C., and samples were taken at regular intervals until the resin had totally deteriorated or there was adherence to the cylinders. The coloration of the samples was evaluated in accordance with the Gardner scale.

This test makes it possible to trace the changes in coloration of a sample subjected to simultaneous thermal and mechanical deterioration, as well as to follow the progressive decrease in stabilization in the course of the test.

The following resin was used:

| Ingredients | Parts by weight |
| --- | --- |
| Polyvinyl chloride (SOLVIC 258 RD) | 100 |
| Acrylic resin | 8 |
| Epoxidized soya oil | 4 |
| Calcium stearate | 0.2 |
| Zinc stearate | 0.1 |
| Hydrogenated castor oil | 1.2 |
| Glycerol trimontanate | 0.4 |
| Stabilizer(s) | 0.3 |

The following results were obtained:

TABLE 7

| Stabilisant | | | | Temps en minutes | | | | | | | | | | | |
| --- | --- | --- | --- | --- | --- | --- | --- | --- | --- | --- | --- | --- | --- | --- | --- |
| N° Code | Conc. | N° | Conc. | 2 | 3 | 4 | 5 | 6 | 7 | 8 | 9 | 10 | 12 | 14 | 16 |
| — | — | 4 | 0,3 | 3 | >3 | 4 | 8 | 9 | 9 | 10 | >10 | <11 | <13 | 15 | — |
| L 28504 | 0,3 | — | — | <3 | 3 | 4 | 6 | 8 | >8 | >9 | >10 | <13 | 16 | 18 | — |
| L 28504 | 0,2 | 4 | 0,1 | >2 | <3 | 3 | >4 | 5 | >6 | 7 | >8 | <9 | 10 | 12 | — |
| L 28507 | 0,3 | — | — | <3 | 3 | 5 | >6 | 8 | <9 | >9 | >10 | <13 | 16 | 18 | — |
| L 28507 | 0,2 | 4 | 0,1 | >2 | <3 | 3 | 4 | <5 | >6 | 7 | >8 | <9 | >10 | 15 | — |
| L 28591 | 0,3 | — | — | <3 | 3 | >4 | 6 | 8 | <9 | <10 | >10 | <13 | 16 | 18 | — |
| L 28591 | 0,2 | 4 | 0,1 | >2 | <3 | 3 | 4 | 5 | >6 | 7 | >8 | <9 | 10 | 12 | — |
| — | — | 4 | 0,3 | >2 | 3 | 5 | 5 | <9 | 9 | 9 | 10 | <11 | <12 | 13 | — |
| L 28511 | 0,3 | — | — | 3 | 3 | 4 | 6 | <7 | 7 | >7 | <9 | >11 | 13 | 16 | — |
| L 28511 | 0,2 | 4 | 0,1 | 3 | 3 | >3 | >3 | <4 | >4 | 6 | 7 | <9 | 9 | 11 | — |
| L 28512 | 0,3 | — | — | 3 | 4 | 4 | 5 | >5 | 7 | <9 | <10 | >11 | 14 | 16 | — |
| L 28512 | 0,2 | 4 | 0,1 | >2 | <3 | >3 | >3 | <5 | >5 | 6 | <7 | <9 | 9 | 11 | — |
| L 28513 | 0,3 | — | — | 3 | 3 | <5 | 5 | 6 | >8 | <9 | <10 | 11 | 16 | 17 | — |
| L 28513 | 0,2 | 4 | 0,1 | 3 | 3 | 3 | >3 | >4 | 5 | >6 | 8 | 9 | 9 | 11 | — |
| — | — | 4 | 0,3 | <3 | <4 | 4 | >6 | <9 | 9 | <10 | 10 | <11 | 12 | 16 | — |
| L 28509 | 0,3 | — | — | >2 | 3 | 3 | 4 | 5 | 7 | 8 | 9 | 10 | 13 | 17 | — |
| L 28509 | 0,2 | 4 | 0,1 | >2 | 3 | 3 | 4 | 5 | >6 | <9 | <10 | 10 | >11 | 17 | — |
| L 28597 | 0,3 | — | — | >2 | 3 | 3 | 4 | 5 | 7 | 9 | >10 | 12 | 16 | 17 | — |
| L 28597 | 0,2 | 4 | 0,1 | >2 | 3 | 3 | 3 | 4 | 5 | 7 | >9 | 10 | 12 | 16 | — |
| — | — | 5 | 0,3 | 3 | 3 | >3 | <4 | 5 | <8 | >8 | 9 | >9 | >10 | <11 | — |
| L 28504 | 0,3 | — | — | >2 | <3 | 3 | 4 | 5 | 8 | <9 | 9 | 10 | 11 | 16 | — |
| L 28504 | 0,2 | 5 | 0,1 | 2 | >2 | >2 | >2 | 3 | 4 | 5 | >5 | <7 | >8 | <10 | — |
| L 28511 | 0,3 | — | — | >2 | >2 | 3 | 4 | 5 | 8 | <9 | 9 | 10 | 11 | 16 | — |
| L 28511 | 0,2 | 5 | 0,1 | >2 | >2 | <3 | <3 | >3 | <5 | 6 | <7 | <9 | 9 | >10 | — |
| L 28513 | 0,3 | — | — | <3 | <3 | >3 | >4 | 5 | 7 | <9 | >9 | <10 | 11 | 15 | — |
| L 28513 | 0,2 | 5 | 0,1 | <3 | <3 | 3 | 4 | 5 | 6 | 7 | 8 | <9 | >9 | >10 | — |
| — | — | 5 | 0,3 | 2+ | 2+ | 2+ | 3 | 4 | 4 | <7 | 9 | 10+ | 10+ | 11 | — |
| L 28590 | 0,3 | — | — | 2+ | 2+ | 4+ | <7 | 7 | 8 | <9 | 10+ | 11— | 12+ | 14 | — |
| L 28590 | 0,2 | 5 | 0,1 | 2 | 2 | 2+ | 2+ | 3 | 3 | 4 | 6+ | 9— | 10+ | 10+ | — |
| L 28596 | 0,3 | — | — | 2+ | 3 | 4+ | 7 | 9— | 10— | 10— | 10+ | 11— | 11 | 13— | — |
| L 28596 | 0,2 | 5 | 0,1 | 2 | 2 | 2+ | 3 | 3 | 3 | 4+ | 4+ | 7— | 8+ | 9 | — |
| — | — | 5 | 0,3 | 2+ | 2+ | 3— | 3+ | 5 | 7— | 9— | 9 | 10— | 10+ | 12— | — |
| L 28541 | 0,3 | — | — | 3+ | 3+ | 3+ | 4 | 8 | 9— | 9 | 11— | 11— | 12— | 15 | — |
| L 28541 | 0,2 | 5 | 0,1 | 3 | 3+ | 4+ | 4 | 4 | 6 | 7 | 8+ | 8+ | 10+ | 11 | — |
| — | — | 6 | 0,3 | 3— | 3— | 4 | 8+ | 9 | 10+ | 10+ | 11— | 11+ | 15+ | 18 | 18+ |
| L 28507 | 0,3 | — | — | 1+ | 2+ | 3+ | 5 | 7 | 8+ | 9 | 10+ | 11— | 13— | 17+ | 18 |
| L 28507 | 0,2 | 6 | 0,1 | 1+ | 2 | 2+ | 2+ | 3 | 7— | 8+ | 9 | 10 | 11— | 13— | 17+ |
| L 28511 | 0,3 | — | — | 2+ | 3— | 4 | 6 | 9— | 10— | 10 | 11— | 12 | 17+ | 17+ | 18 |
| L 28511 | 0,2 | 6 | 0,1 | 2+ | 2+ | 2+ | 2+ | 4— | 6+ | 8+ | 9 | 10— | 11— | 13— | 17 |

The sign + indicates that the coloration is between the unit below and the next higher half unit, i.e., 3+ means that coloration is situated between 3 and 3.5. In like manner, the sign — indicates that the coloration is between the next lower half unit and the unit above it. In addition, >3 indicates that the coloration is between 3 and 3+. These results clearly demonstrate the synergism of the stabilizing power of Formula I compounds and β-aminocrotonates.

C. Study of the influence of the associations according to the invention on sticking time The associations according to the invention have a particularly marked effect on the extension of the sticking time of the vinyl chloride copolymers, as compared to resins which do not contain the association.

In addition, the sticking time of the resins stabilized by an association according to the invention is comparable to that of resins stabilized by a Formula I compound alone.

This effect is very important, as an excessive decrease in the sticking time could prevent the transformation of the resin into finished products.

The following test was carried out:

The resin was mixed and then calendered on cylinders maintained at a temperature between 165° and 170° C., and the time which passed between the beginning of the calendering of the resin and the moment when it began to stick to the cylinders was noted.

The following resin was used:

| Ingredients | Parts by weight |
| --- | --- |
| Vinyl chloride-vinyl acetate (SOLVIC 547 SA) | 80 |
| Polyvinyl chloride (LACQVYL SO71 S) | 20 |
| Lubricant (IRGAWAX 280 from CIBA) | 0.1 |
| Calcium stearate | 0.5 |
| Stabilizer(s) | 0.3 |

The following results were obtained:

TABLE 8

| Stabilizer | | | | Sticking time |
| --- | --- | --- | --- | --- |
| Code | Conc. | N° | Conc. | (en minutes, seconds) |
| L 28504 | 0.3 | — | — | 22 |
| L 28504 | 0.15 | 4 | 0.15 | 22,30 |
| L 28502 | 0.3 | — | — | 24,10 |
| L 28502 | 0.15 | 4 | 0.15 | 23 |

TABLE 8-continued

| Stabilizer | | | | Sticking time |
|---|---|---|---|---|
| Code | Conc. | N° | Conc. | (en minutes, seconds) |
| L 28507 | 0.3 | — | — | 23,10 |
| L 28507 | 0.3 | 4 | 0.15 | 22,45 |
| L 28604 | 0.3 | — | — | 21,20 |
| L 28604 | 0.15 | 4 | 0.15 | 22 |
| L 28590 | 0.3 | — | — | 22,10 |
| L 28590 | 0.15 | 4 | 0.15 | 22,45 |
| L 28599 | 0.3 | — | — | 26 |
| L 28599 | 0.15 | 4 | 0.15 | 23,30 |
| L 28601 | 0.3 | — | — | 23,30 |
| L 28601 | 0.15 | 4 | 0.15 | 21,30 |

These results show that the associations according to this invention do not significantly alter the fixing time.

We claim:

1. New stabilizing association for vinyl resins made up of vinyl polymers or copolymers, characterized by the fact that it includes a dihydropyridine derivative of the general formula:

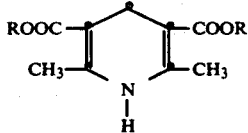   I in which R represents a linear alkyl radical containing from 1 to 22 carbon atoms, a linear alkenyl radical containing 3 to 18 carbon atoms, a linear alkynyl radical containing 3 to 11 carbon atoms, or an aralkyl radical, optionally substituted in the ortho or para position by a halogen atom or by a methyl or methoxy radical, or R represents a phenyl radical, optionally substituted in the para position by a methoxy radical, or R represents a radical $R_1-O-(CH_2)_n-$ in which n has the value 2, 3, or 4, and $R_1$ represents a linear alkyl radical containing 1 to 4 carbon atoms or a phenyl radical, and a β-aminocrotonic acid derivative of the general formulas:

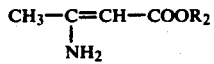   II

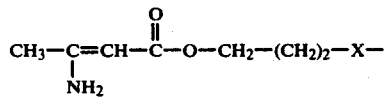   III $$-(CH_2)_2-O-\overset{O}{\underset{\|}{C}}-CH=\underset{NH_2}{\overset{|}{C}}-CH_3$$

in which $R_2$ represents a linear alkyl radical with 1 to 8 carbon atoms or a mixture of linear alkyl radicals containing 16 to 18 carbon atoms, and X represents a sulfur or oxygen atom or a single bond.

2. New association according to claim 1 characterized by the fact that the β-aminocrotonic acid derivative is selected from the group consisting of the β-aminocrotonate of butanediol, the β-aminocrotonate of thiodiglycol, methyl β-aminocrotonate, and the β-aminocrotonate of a mixture of alcohols with 16 to 18 carbon atoms.

3. Vinyl resins made up of vinyl polymers or copolymers characterized by the fact that they contain an association according to claim 1 as a stabilizer.

4. Vinyl resins according to claim 3 characterized by the fact that the proportion of each of the components of the association in the resin is such that the quantity of dihydropyridine derivative is from 0.01 to 0.5 part by weight per 100 parts of resin and the quantity of β-aminocrotonic acid derivative is from 0.1 to 1.0 part by weight per 100 parts of resin.

5. Vinyl resins according to claim 4, characterized by the fact that the quantity of dihydropyridine is from 0.01 to 0.3 part and the quantity of β-aminocrotonic acid derivative is from 0.1 to 0.5 part.

6. Vinyl resin according to any one of claims 3 to 5, characterized by the fact that it is made up of polyvinyl chloride.

7. Vinyl resin according to any one of claims 3 to 5, characterized by the fact that it is made up of a vinyl chloride-vinyl acetate copolymer.

8. Vinyl resin according to any one of claims 3 to 5, characterized by the fact that it is made up of a vinyl chloride-vinylidene chloride copolymer.

9. Thermostabilization process for vinyl resins made up of vinyl polymers or copolymers, characterized by the fact that an association according to claim 1 is added to the resin in a proportion of 0.3 to 0.5 part by weight for each 100 parts of resin.

10. Thermostabilization process for vinyl resins made up of vinyl polymers or copolymers, characterized by the fact that an association according to claim 1 is added to the resin with the proportions of each of the components of said association within the resin being such that the quantity of dihydropyridine derivative is from 0.01 to 0.5 part by weight per 100 parts of resin and the quantity of the β-aminocrotonic acid derivative is from 0.1 to 1.0 part by weight per 100 parts of resin.

11. Process according to claim 10, characterized by the fact that the quantity of dihydropyridine is from 0.01 to 0.3 part by weight and the quantity of the β-aminocrotonic acid derivative is from 0.1 to 0.5 part per 100 parts by weight of resin.

* * * * *